United States Patent [19]
Wood et al.

[11] Patent Number: 5,195,361

[45] Date of Patent: Mar. 23, 1993

[54] TEST METHOD AND APPARATUS FOR BOP EQUIPMENT

[75] Inventors: Gary R. Wood, Lemon Grove Spring; Carl P. Hutchinson, El Campo, both of Tex.

[73] Assignee: Petco Equipment Tools Co., Houston, Tex.

[21] Appl. No.: 797,682

[22] Filed: Nov. 25, 1991

[51] Int. Cl.⁵ .............................................. G01M 3/04
[52] U.S. Cl. ......................................... 73/49.8; 73/40; 73/46; 269/24; 269/27
[58] Field of Search .................. 73/37, 40, 46, 49.8, 73/49.4, 49.1; 269/24, 25, 27, 35, 140, 155

[56] References Cited
U.S. PATENT DOCUMENTS

| | | | |
|---|---|---|---|
| 1,298,236 | 3/1919 | McKenzie | 73/46 |
| 2,934,942 | 5/1960 | Carrie | 73/49.1 |
| 2,934,943 | 5/1960 | Carrie | 73/46 |
| 3,163,035 | 12/1964 | Kinzie et al. | 73/49.8 |
| 4,311,038 | 1/1982 | Dunn | 73/49.8 |
| 4,432,227 | 2/1984 | Dunn | 73/49.8 |
| 4,587,836 | 5/1986 | Hewlett | 73/49.8 |
| 4,893,494 | 1/1990 | Hart | 73/37 X |

*Primary Examiner*—Hezron E. Williams
*Assistant Examiner*—Michael J. Brock
*Attorney, Agent, or Firm*—Gunn, Lee & Miller

[57] ABSTRACT

A test device and method of testing includes a BOP skid mounted to center an upright housing and piston beneath the BOP. A flange on the BOP mates with a flange on the housing to enable the BOP to be clamped by a ring. The ring is divided into two halves having upper and lower encircling lips. In the housing, the piston seats a seal ring to isolate fluid in a chamber for pressure testing of the seal ring with the flange and other components of the BOP. In addition, the test device and method can be applied to industry standard flanges on valves and the like.

19 Claims, 2 Drawing Sheets

TEST METHOD AND APPARATUS FOR BOP EQUIPMENT

BACKGROUND OF THE DISCLOSURE

A flanged device is ordinarily bolted by a set of bolts and nuts to assemble into a high pressure system, e.g., a valve in pipeline and the like. The seal is critical in high pressure devices. Another example is found in the flange connections of an assembled blow out preventer stack, often called the BOP stack. A method and a test device are disclosed so that a seal can be established at the ring or seal gasket located between two opposing flanges by means of a hydraulic force transmitted from the test piston to the seal area between the flanges.

AN EXAMPLE OF THE PROBLEM

A BOP stack is one or more blowout preventers arranged in an assembly ready to be installed at a wellhead. For safety, a BOP stack is positioned at the wellhead, and is located so that the well can be protected in the event of a blowout. A blowout can occur by flowing excessive gas or oil in the annular space, or even flowing up through the drill string. A typical BOP stack includes several sets of rams including a first set of opposing rams which are powered to stop the annular flow, a second set arranged above the first set of rams, and sometimes even a third set. Suffice it to say, the BOP stack must be properly assembled and installed and proper installation hinges on a leakproof connection between the BOP stack components and the wellhead flange connections that is arranged at the top of the casing as the well is spudded in.

ANOTHER EXAMPLE OF THE PROBLEM

A second example of the problem arises in placing a high pressure valve between a pressure storage tank and supply line. Assume that a pressure vessel for storing fluid at more than 3000 psi must be connected to a valve and then to a supply line. Assume further that an eight inch line is used with an eight inch valve. There are two sets of flanges to be connected to this system.

The present apparatus sets forth a test mechanism to be used with the flanged components, e.g., a BOP flange so that the well can then be drilled with the full assurance that the flanged components have been properly tested; or, a flanged valve must be tested. This test procedure enables one to test and fasten a BOP (or other flanged items) on a mock up of the conforming and connected flanged equipment. Then, hydraulic pressure can be applied opposite the flanged item to simulate actual operating conditions. To do this, the flanged devices (e.g., BOP or valve) must be first bolted in place for testing.

Ordinarily, the flanged equipment of the BOP stack terminates at its lower face at a flange which has a number of holes drilled in it on a bolt circle with the thickness of the flange, spacing of the bolt holes and other flange details determined by industry standards. It is not uncommon to require as many as 18 to 24 bolts to anchor a large flange opposite to a mating flange to simulate the flanged connected equipment.

In the event that a deep well BOP stack is tested component by component and then assembled, the components are quite large, difficult to handle because of its size and weight, and difficult to test. Indeed, installation for testing may require that as many as 24 large bolts be positioned in the flange, aligned with the matching holes in the opposite flange, and then tightened with controlled torque applied to the nuts threaded to the bolts. It can often take several hours to position the bottom flanged component of a BOP above the flange which simulates the cooperative mounting structure, make the necessary connections with the nuts and bolts and then run the test. Among other things, one part of the test preparation is to assure proper seating and alignment of the gaskets deployed at the bottom of the BOP. Another part of the test in the context of BOP components involves actual component operation at anticipated pressure levels, e.g., 5000 to 25000 psi necessary to test ram operation. Once the testing is successfully completed, the very large nuts and bolts are then unthreaded and removed so the BOP components can then be transported to the field location of the drilling rig and then installed. This testing is a very cumbersome procedure and takes extra time to perform, especially flange alignment and bolting.

The present disclosure sets forth a test mechanism which aids and assists in performing preinstallation testing of flanged components, e.g., a BOP or valve. The present apparatus is installed conveniently at any location in the manufacturing plant or yard of a rental facility which makes, assembles or furnishes the high pressure flange items. In a specific example, the BOP flanged parts are placed on this test apparatus for testing. This test apparatus is constructed with a wide flange. This flange readily can equal or exceed the diameter of the flange at the bottom of the flanged item, e.g., the BOP stack, but it does not have to match it because there are no bolt holes formed in this apparatus. Further, this apparatus is operatively installed so that the flange at the bottom of the flanged component does not need to be duplicated. There are many sizes of flanges, and the usual or ordinary requirement would necessitate a mock up for each and every industry standard flange. Thus, the inventory of the manufacturing or rental facility would be quite large and expensive to provide a mock up test for each and every flanged item in stock. That inventory requirement is avoided by the present apparatus which utilizes a large circular flange having a moveable piston on the interior so that the size of the flange of the component being tested can vary, thereby enabling a nearly universal accommodation of a wide range of flanges. While flanges differ, the test apparatus remains unaltered so that one test mechanism can test a range of flange sizes and flanges constructed with different bolt circle arrangements. Further, the test apparatus can test many different sized flanges and ring gaskets, i.e., flanges of different sizes, different gasket profiles, etc.

With this background in view, the present apparatus is summarized as a skid mounted test mechanism having a short upstanding open top cylindrical housing. It has a fluid receiving chamber at the bottom end. A large piston fits in the housing and is sealed so that the chamber at the bottom end of the housing can receive pressure fluid to raise the piston. The piston has multiple circular grooves in its face to accommodate various different sizes of rings and flanges. The piston is centered in a surrounding blank flange having no holes in it. The test flange axially aligns against any number of flanges on the flanged test component which are constructed in accordance with industry standards. Even though the flange on the housing can accommodate a wide range of mating flanges, it does not require the drilled bolt holes in it. In particular, the flange at the top of the housing is held against the bottom most flange on the test component by a semicircular clamp which is duplicated on the left and right sides so that two such clamps come together forming an encircling clamping ring reaching over and under the two flanges and holding them in close proximity. The two semicircular rings are hydraulically moved toward and away from each other by means of an actuation mechanism formed by duplicate, opposing, double acting hydraulic cylinders with extending piston rods connected at a clevis to the two semicircular clamp segments. This motion assures clamping to hold two flanges temporarily together without bolting the facing flanges. The apparatus includes the moveable piston which is machined at its upper face exposed to the bottom component flange with a number of grooves conforming to the gasket rings which are fastened between the component flange and the test apparatus in simulation of proper installation in the field which occurs after testing in accordance with the present disclosure. Conveniently, the moveable piston also has a central threaded opening to enable threading of a pipe stub to simulate drill pipe extending through a flange connected BOP.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
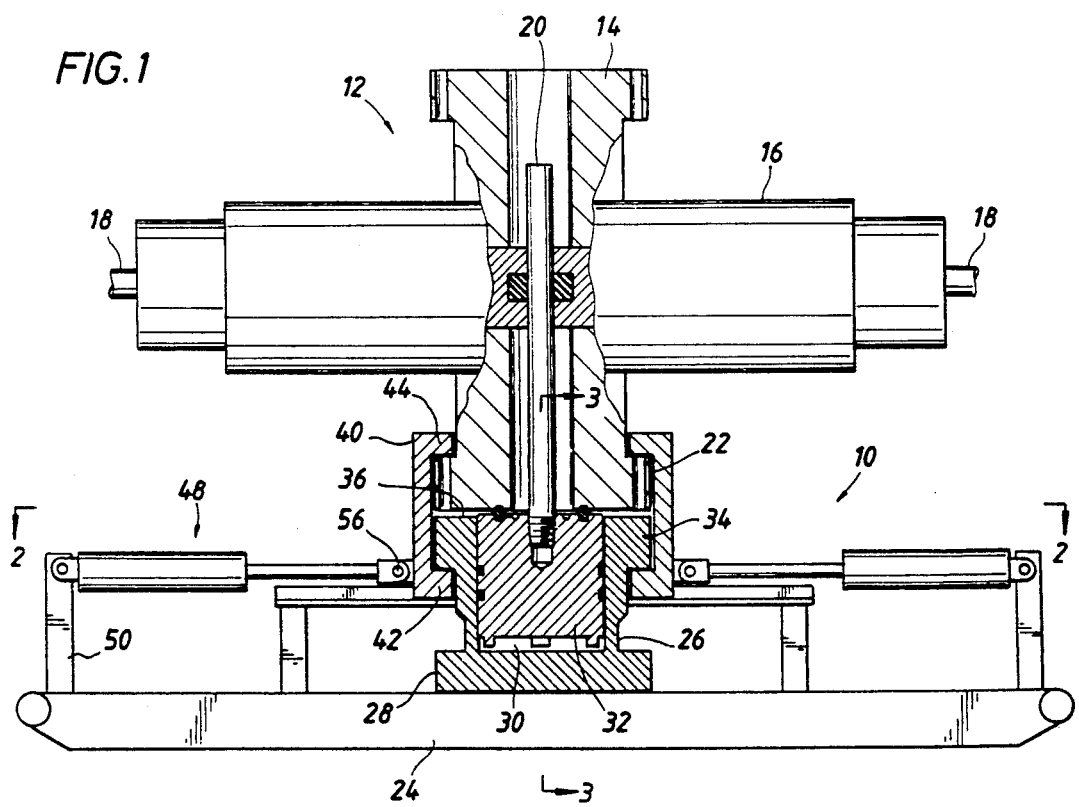
FIG. 1 is a side view of the test apparatus of the present disclosure supporting a BOP components temporarily without bolting so that the gaskets and pressure integrity of the connection of the BOP component can be tested prior to installation wherein the skid mounting test apparatus is shown in sectional view.

Attention is directed to FIG. 1 of the drawings where the numeral 10 identifies the test equipment of this disclosure. It is connected with a flange connected BOP 12 which is temporarily installed on the test apparatus for testing purposes. After a brief description of the BOP component, details of the test equipment will be given. The disclosure will primarily use a BOP as the flange equipped device as an example for testing. Another device having such a flange is a high pressure pipeline valve. Many other examples can also be developed.

The BOP incorporates an upstanding tubular member 14 which supports left and right rams in suitable cylindrical housings 16. The rams are driven by hydraulic pressure which is applied through the lines 18 so that the rams are able to close toward the annular space. The rams can either be profiled to fit around a joint of drill pipe 20 or they can close flow through the BOP. Two and sometimes three individual BOP devices are installed serially by connecting at flange connections. This BOP is similar in the fact that it includes a bottom most flange 22 which enables connection to the wellhead equipment connected to the casing in drilling a well. The flange 22 can be quite large and can easily measure two or three feet in diameter, is quite thick, often several inches in thicknes, and typically requires as many as a 16 to 24 large bolts for installation. Moreover, the bolts are quite long, difficult to handle because of their size, and require threading. The bolts are threaded to relatively large nuts which require power driven nut drivers, and the last few turns must be applied with a torque wrench having a controlled or limited amount of torque applied through the wrench to fasten the nuts on the bolts. The nuts must be tightened in a particular sequence around the flange. Sometimes a hammer must be used to tighten the nuts on the bolts. Suffice it to say, this procedure takes several hours to execute to assure that the flange connection is properly made.

One purpose in testing the flanged equipment is to assure that the flanged equipment such as a BOP is able to hold hydraulic pressure; it is tested to a specified level by holding a specific pressure for a specific time. This test also involves the gaskets between the flanges as will be described. In general, this testing conveniently occurs at the rental facility where the BOP is assembled and tested before it is shipped to the field. Also, testing may occur at the manufacturing plant. The present apparatus accommodates such testing and does not require that the industry standard flange be bolted to complete the test.

ONE EMBODIMENT

The preferred form of the apparatus 10 is a skid mounted structure supported on a rectangular framework 24. It is constructed with a central upstanding cylindrical housing 26. The housing 26 is supported on a bottom plate 28 which is centered in the equipment. Moreover, the housing 26 encloses a bottom pressure fluid receiving chamber 30. The chamber 30 is beneath a piston 32. The piston is moved in response to the introduction of fluid pressure beneath the piston, and the piston is sealed by appropriate seal rings around the periphery to assure a leak-proof chamber 30. The upstanding housing terminates at a circular flange 34 which does not require bolt holes for fastening. The flange terminates at a face 36 which confronts the bottom flange of the BOP 12. More will be noted concerning that hereinafter. The two flanges are clamped by an encircling clamp ring divided into two or more portions. Since the clamp rings are identical, a description of one will suffice for the other. The left hand ring 40 is semicircular, and is also sized to fit around the two flanges and to grip them. There is a lower lip 42 which extends radially inwardly and is parallel to an upper lip 44 which also extends radially inwardly. The lips 42 and 44 serve as a clamping mechanism grasping the two facing flanges and holding them in relative position with respect to each other. The semicircular clamp 40 is forced toward the two flanges by means of a hydraulically powered piston and cylinder arrangement 48. It is also possible to use other types of motive device to initiate clamping. While as few as two clamp rings may grasp almost 360° of the flange circumference, it may be possible to grasp less than this by grasping less of flange. One form of grasping device may be several U-shaped clamps which grasp the two facing flanges. Other configurations may be used, e.g., grasping devices which secure the two facing flanges in opposed relationship.

Figure 2:
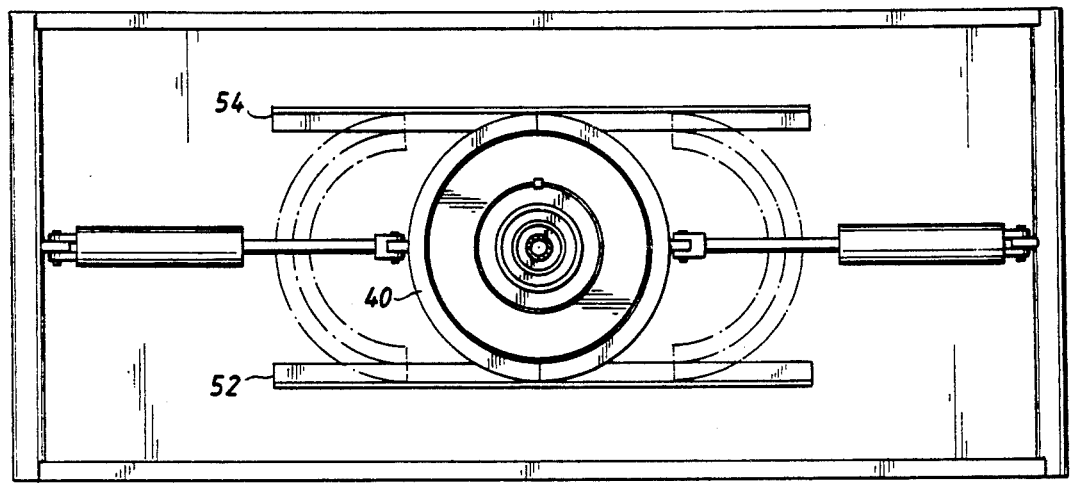
FIG. 2 is a sectional view along the line 2—2 of FIG. 1 showing details of construction of the opposing semicircular clamps which move to the clamping position in full line and which can retract to the dotted line position to open and thereby release the BOP component.

Each cylinder is mounted by a pivot to an upstanding post 50 attached to the sled or skid 24. Further, left and right angle irons 52 and 54 serve as guide rails and identified at 52 and 54 in FIG. 2 of the drawings. A pivot connection 56 enables the semicircular clamp 40 to connect with the piston rod extending from the cylinder 48. As shown in FIG. 2 of the drawings, pivotal movement at both ends of the hydraulic cylinder and piston construction assures modest realignment so that the two flanges are properly gripped by the clamp 40.

Figure 3:
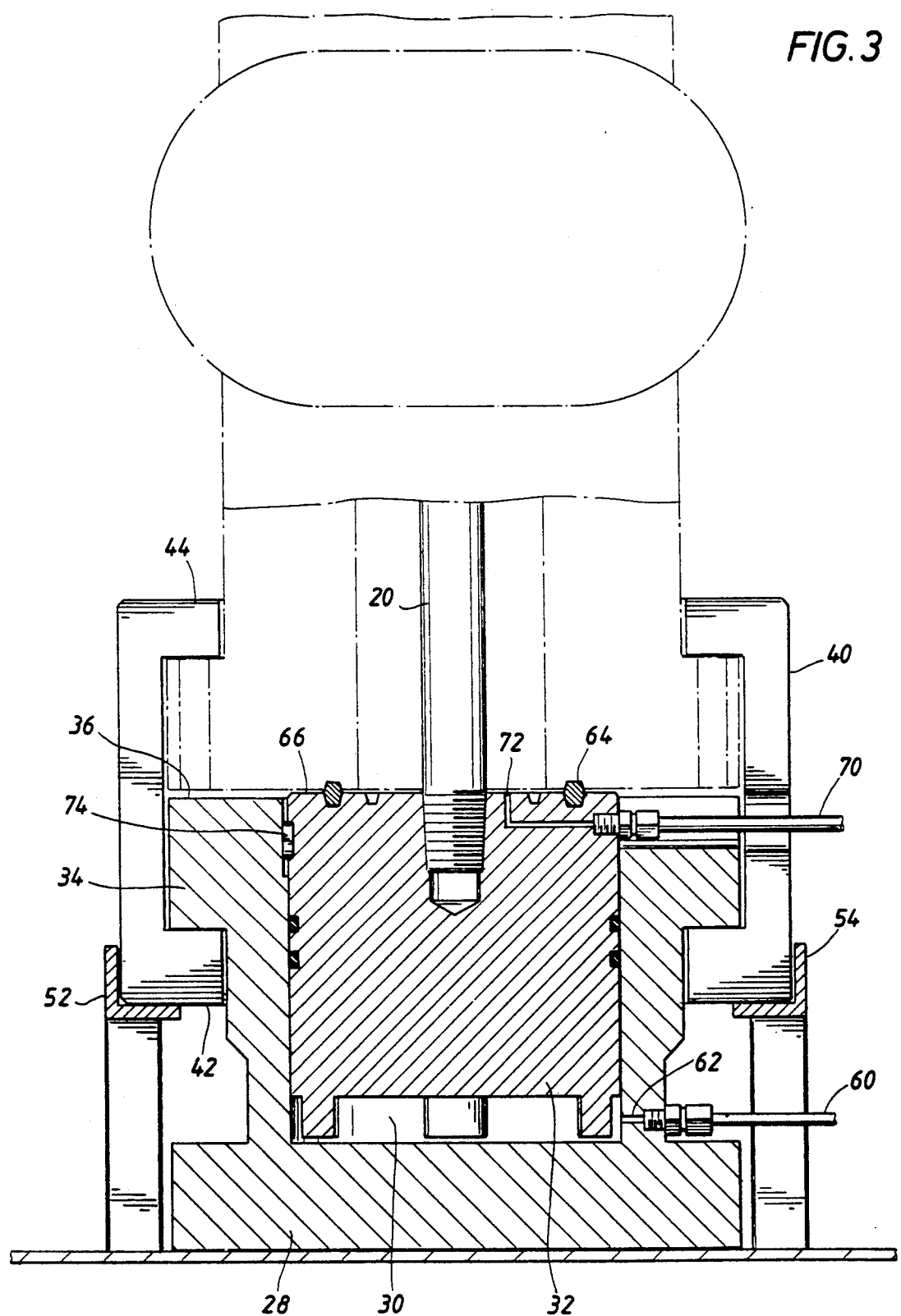
FIG. 3 is an enlarged sectional view through the test apparatus showing the piston in the cylindrical housing and further showing hydraulic flow lines which enable the application of test pressures to the BOP stack to provide a controlled and certified pressure test of the seals involved in the BOP stack.

Attention is now directed to FIG. 3 of the drawings for a more detailed description of the test apparatus. FIG. 3 shows a high pressure hydraulic feedline 60 input through appropriate hydraulic fittings through the passage 62 for the lower chamber 30. In addition, there is a similar hydraulic feedline at the top of the piston 32 to provide pressure at the top end. This is particularly helpful in testing as it relates to assuring seating of a gasket ring 64. The gasket ring 64 is received in an appropriate groove in both flanges to hold pressure in the upper chamber. Additional grooves for alternate sizes of gasket rings are formed in the top face 66 of the piston. Moreover, the gasket 64 is selected and sized for the particular size BOP flange undergoing test.

The ring 64 is installed with the BOP on the test equipment. The ring 64 is located so that it defines a pressure test chamber on the interior of the ring 64. The chamber inside the ring 64 is exposed to high pressure fluid introduced through a feedline 70 having appropriate fittings enabling the line 70 to connect with a passage 72 drilled through the piston and opening on the inside of the grooves into the chamber. The ring 64 confines pressure in the chamber at the top face of the piston. While, the top face 66 has an outer portion outside of the gasket ring, the area or face portion within the ring defines the upper chamber which is provided with pressurized fluid through the line 70. The piston cannot rotate in the cylinder because it is held against rotation by an alignment pin or key 74 which engages a groove along the length of the cylinder. This pin or key permits axial movement but forbids rotational movement of the piston.

AN EXEMPLARY TEST PROCEDURE

Operation of the present test apparatus and method proceeds in the following steps using the BOP as an example. The BOP first is assembled, and after assembly, it is positioned above the gasket or seal ring 64 on the face 66. The ring is positioned in the appropriate ring groove on the face 36. The BOP is moved by an overhead hoist or the like so that it is aligned above the piston 32. The piston 32 is raised slightly by application of hydraulic pressure to the chamber 30 below the piston. This raises the piston sufficiently so that it can be visually inspected as it is centered beneath the BOP to assure that the ring 64 seats properly in the two facing grooves to enable alignment of the two facing flanges.

As observed in FIG. 3 of the drawings, there is a pressure chamber above the piston 32 which is defined as a circular space within the gasket ring 64. There is a separate chamber 30 at the bottom of the piston. These chambers may be constructed so that they are different in cross-sectional area. Any area ratio that is desired can be accomplished. It is desirable that the ring 64 conform to the gasket size appropriate for installation on the flanged apparatus, and it is further appropriate that the ring 64 confront the BOP flange and seat against it. Therefore, the piston is preferably constructed with a maximum diameter consistent with the size of grooves formed in the BOP flange, at least for a number of sizes. Assume for purposes of description that the cross-sectional area in the chamber 30 is twice the area in the ring 64. This enables a pressure balance to be achieved quite readily with a difference in fluid pressure. For instance, if the pressure applied in the chamber 30 is 10,000 psi, it will require a pressure of 20,000 psi to balance the piston assuming the ratio of 2:1 between the two respective areas. This arithmetic can be extended to other ratios.

In actual testing after the two flanges are sealed by the ring 64, a pressure sufficient to establish the seal at the ring 64 between the flanges is achieved in the pressure chamber above the piston for the required time interval. The passage 72 communicates with a line 70 which enables the upper chamber to be filled with pressure fluid. By attaching a pressure gauge to the line 70, the pressure in the upper chamber can be measured. It is important to hold this pressure for an interval and to make observation of the pressure to assure that it sustains the required minimum level. Moreover, the pressure applied to the line 70 is applied in a fashion to assure that the seal ring 64 is subjected to the pressure and yet moves to properly seat which is necessary for sealing in the conformed groove. Pressure is applied for an interval depending on the specifications for the BOP and the qualification tests required prior to installation. One important feature is the application of pressure in the device being tested. Ranging from a simple flange to a valve or to a BOP, pressure accomplishes component testing. In a BOP, this includes numerous seals in the ram mechanisms or other components of the device being tested as an example.

The present apparatus can be used to test a number of different BOP's to form a stack. For instance, it can be used with several BOP's which join to form a stack when installed. This apparatus can be used with alternate sized flanges so that the alternate grooves in the top face 66 of the piston can be used. This in part depends on the particular items to be tested.

In addition, the test apparatus is especially beneficial in that it can be rigged very quickly, the test quickly performed, and then the tested equipment can be shipped assuming that the test goals are met. In this regard, the flange is grasped and held by the set of arcuate champ means. The semicircular holding devices clamp so that the protruding lips 42 and 44 hold the two flanges in spaced relationship, and these enable the quick fastening and quick release. This avoids the necessity of threading a number of bolts in place, placing the nuts on them, and then torquing the nuts to the required tension.

The present apparatus in one form is a portable structure which enables the device to be moved from location to location to run a multiplicity of tests. This apparatus can be quickly rigged for operation. If desired, alternate sets of semicircular clamps 40 can be used where each of the several sets have different diameters or different thicknesses to grasp flanges of different diameter or thickness. Some initial gap is left between the two flanges which are captured in the test device 10, but this gap can be reduced by merely extending the piston 32 above the top flange face 36. Such movement is permitted because the fluid line 70 which connects to the upper chamber above the piston 32 extends through a slot formed in the surrounding housing. The fluid line 70 can therefore move upwardly and downwardly with the piston.

ALTERNATE FORMS OF TEST APPARATUS 10

The test apparatus 10 shown in FIG. 1 is illustrated on a skid for movement. That is especially helpful in a rental facility such as the yard at a BOP rental store. An alternate embodiment can be readily achieved merely by anchoring the skid, for example, beneath an overhead crane so that large valves having industry standard flanges can be moved to the facility for testing at a manufacturing plant. Another embodiment can be used by constructing the encircling flange with holes in it or, perhaps even more conveniently, with arcuate slots to receive extending studs affixed to an industry standard flange. In larger flanges, the mode of construction normally involves fabrication of the flange with a number of holes arranged on a common bolt circle. The size and location of the holes derives from industry standards which relate to the flange rating. There are industry standard flanges for flanged equipment which also include permanently attached protruding studs. To accommodate such studs, the flange 34 shown in FIG. 3 of the drawings must therefore include the appropriate matching holes, this permitting the permanently attached studs to extend through the flange and to be exposed below the flange. In that particular instance, the protruding studs merely extend through the flange 34 on the housing, and the two clamp rings 40 are preferably deleted while the nuts are slightly tightened on the permanently attached studs. In that instance, it is not necessary to thread up the studs with the mating nuts and torque the nuts to the required tension in the studs.

While the foregoing is directed to the preferred embodiment, the scope thereof is determined by the claims which follow.

What is claimed is:

1. A BOP test apparatus comprising:
   (a) an upstanding hollow cylindrical housing having a chamber therein;
   (b) a piston sealingly positioned in said chamber for movement therein to define a lower pressure fluid receiving chamber and an upper pressure fluid receiving chamber separated by said piston;
   (c) an upwardly directed face on said piston for mating positioning opposite the bottom flange of a BOP so that the bottom flange when positioned thereagainst defines the upper pressure fluid receiving chamber therewithin above the piston isolated from the chamber below the piston; and
   (d) means for temporarily clamping the BOP bottom flange so that the BOP can be pressure tested by pressure fluid isolated above the piston in the upper pressure fluid receiving chamber, said clamping means comprising separate first and second facing portions of a clamp ring constructed with and defined by semicircular clamp rings, wherein said clamp rings have spaced parallel surfaces bearing against the bottom flange of the BOP and an uppermost flange on said housing to enable testing.

2. The apparatus of claim 1 including a shaped seal ring groove in the upper face of said piston adapted to receive a BOP seal ring therein, and further including a seal ring positioned in said groove and conforming against and cooperative with a mating and matching seal ring groove in the bottom flange of the BOP being tested.

3. The apparatus of claim 2 further including a recessed hole formed in the center axial portion of said piston for threaded connection with a pipe extending into the BOP.

4. The apparatus of claim 3 including a supporting skid mounting said housing and also supporting means closing said clamping means for clamping the BOP bottom flange.

5. The apparatus of claim 1 further including a recessed hole formed in the center axial portion of said piston for threaded connection with a pipe extending into the BOP.

6. The apparatus of claim 1 including a skid having a pair of spaced guide means cooperatively guiding said clamping means into closure around the bottom flange on the BOP.

7. The apparatus of claim 6 including a hydraulic powered piston and cylinder connected to move said clamping means into clamping relationship securing the BOP bottom flange.

8. The apparatus of claim 7 including two opposing hydraulic powered pistons and cylinders for moving said semicircular clamp rings of said clamping means into clamping relationship securing the BOP to a surrounding flange on said housing.

9. A method of testing a BOP comprising the steps of:
   (a) moveably positioning a piston having an upper face in a cylinder to expose the upper face of said piston for movement toward a BOP having a bottom flange and a fluid pressure responsive system;
   (b) positioning a seal ring between the BOP bottom flange and above the upper face of the piston to seat and seal therebetween;
   (c) aligning the BOP to position the bottom flange thereon with a flange around the cylinder;
   (d) clamping during testing the bottom flange of the BOP and the flange around the cylinder to form a fluid tight chamber above the upper face of the piston and including the cylinder, and the fluid tight chamber operatively connects with the BOP; and
   (e) moving the piston toward the BOP to enable testing of the chamber defined by the seal ring wherein the piston captures fluid in said seal ring.

10. The method of claim 9 wherein the step of clamping includes moving a pair of spaced clamps into conformed contact around the BOP flange.

11. The method of claim 10 further including the step of initially temporarily clamping the pair of spaced clamps around the BOP flange, forming a raised fluid pressure within the BOP fluid pressure responsive system for a specified interval, and thereafter releasing the fluid pressure within the fluid pressure response system of the BOP, and then moving the pair of spaced clamps to thereby unclamp the BOP flange.

12. The method of claim 9 including the step of defining upper and lower fluid receiving chambers relative to said piston wherein said upper chamber is defined by said seal ring to receive fluid therein during testing for a selected interval.

13. The method of claim 12 wherein the lower fluid receiving chamber relative to said piston is provided with fluid under pressure to raise the piston and thereby increase the pressure in the upper fluid receiving chamber, and including the step of raising the fluid pressure within the BOP which is held above a specified test pressure for a specified interval.

14. A flanged equipment test apparatus comprising:
   (a) an upstanding hollow cylindrical housing having a chamber therein;
   (b) a piston sealingly positioned in said chamber for movement therein to define a lower pressure fluid receiving chamber and an upper pressure fluid receiving chamber separated by said piston;
   (c) an upwardly directed face on said piston for mating positioning opposite the bottom flange of a flanged equipment so that the bottom flange when positioned thereagainst defines the upper pressure fluid receiving chamber therewithin above the piston isolated from the chamber below the piston; and
   (d) means for temporarily clamping the flanged equipment bottom flange so that the flanged equipment can be pressure tested by pressure fluid isolated above the piston in the upper pressure fluid receiving chamber from an interval, said clamping means comprising separate first and second facing halves of a clamp ring constructed with and defined by semicircular clamp rings, wherein said clamp rings have spaced parallel surfaces bearing against the bottom flange of the flanged equipment and an uppermost flange on said housing to enable testing.

15. The apparatus of claim 14 including a shaped seal ring groove in the upper face of said piston adapted to receive a seal ring therein, and further including a seal ring positioned in said groove and conforming against and cooperative with a mating and matching seal ring groove in the bottom flange of the flanged equipment being tested.

16. The apparatus of claim 14 including a supporting skid mounting said housing and also supporting means closing said clamping means for clamping the flanged equipment at an encircling flange thereon.

17. The apparatus of claim 14 including a skid having a pair of spaced guide means supporting and guiding said clamping means into closure around the bottom flange on the flanged equipment.

18. The apparatus of claim 17 including a hydraulic powered piston and cylinder connected to move said clamping means into clamping relationship.

19. The apparatus of claim 18 including two opposing hydraulic powered pistons and cylinders for moving separate halves of said clamping means into clamping relationship securing the flanged equipment to a surrounding flange on said housing.

* * * * *